United States Patent
Chiong

(10) Patent No.: US 9,988,494 B2
(45) Date of Patent: Jun. 5, 2018

(54) METHOD FOR FORMING A HIGH MOLECULAR WEIGHT POLYARYLENE SULFIDE

(71) Applicant: Ticona LLC, Florence, KY (US)

(72) Inventor: Hendrich A. Chiong, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days. days.

(21) Appl. No.: 15/045,301

(22) Filed: Feb. 17, 2016

(65) Prior Publication Data

US 2016/0244568 A1  Aug. 25, 2016

Related U.S. Application Data

(60) Provisional application No. 62/118,001, filed on Feb. 19, 2015, provisional application No. 62/197,637, filed on Jul. 28, 2015, provisional application No. 62/206,135, filed on Aug. 17, 2015.

(51) Int. Cl.
  *C08G 75/14* (2006.01)
  *C08L 81/02* (2006.01)
  *C08G 75/0209* (2016.01)

(52) U.S. Cl.
  CPC ......... *C08G 75/14* (2013.01); *C08G 75/0209* (2013.01); *C08L 81/02* (2013.01)

(58) Field of Classification Search
  CPC .............................. C08G 75/0209; C08L 81/02
  USPC ....................................................... 525/537
  See application file for complete search history.

(56) References Cited

U.S. PATENT DOCUMENTS

| | | | |
|---|---|---|---|
| 3,407,182 A | 10/1968 | Hinton | |
| 3,869,433 A | 3/1975 | Campbell | |
| 3,919,177 A | 11/1975 | Campbell | |
| 4,038,259 A | 7/1977 | Campbell et al. | |
| 4,038,260 A | 7/1977 | Campbell | |
| 4,038,262 A | 7/1977 | Edmonds, Jr. | |
| 4,038,263 A | 7/1977 | Edmonds, Jr. et al. | |
| 4,039,518 A | 8/1977 | Campbell | |
| 4,056,515 A | 11/1977 | Vidaurri, Jr. | |
| 4,060,520 A | 11/1977 | Irvin | |

(Continued)

FOREIGN PATENT DOCUMENTS

| | | |
|---|---|---|
| JP | S5829822 | 2/1983 |
| JP | S5847026 | 3/1983 |

(Continued)

OTHER PUBLICATIONS

Machine translation of JP2014028917.

(Continued)

*Primary Examiner* — Michael M Dollinger
(74) *Attorney, Agent, or Firm* — Dority & Manning, P.A.

(57) ABSTRACT

A method for forming a polyarylene sulfide is provided. The method comprises supplying a waste composition to a vessel, the waste composition containing arylene sulfide byproducts, such as an arylene sulfide oligomer, cyclic polyarylene sulfide, and/or fine polyarylene sulfide particles. The arylene sulfide byproducts are heated to a temperature of from about 260° C. to about 285° C. in the presence of a sulfur reactant, thereby forming a high molecular weight polyarylene sulfide having a number average molecular weight of about 2,000 Daltons or more.

32 Claims, 2 Drawing Sheets

(56) References Cited

U.S. PATENT DOCUMENTS

| | | | |
|---|---|---|---|
| 4,064,114 A | 12/1977 | Edmonds, Jr. | |
| 4,089,847 A | 5/1978 | Edmonds, Jr. et al. | |
| 4,096,132 A | 6/1978 | Edmonds, Jr. | |
| 4,368,321 A | 1/1983 | Sherk et al. | |
| 4,370,470 A | 1/1983 | Vidaurri et al. | |
| 4,393,197 A | 7/1983 | Edmonds, Jr. | |
| 4,415,729 A | 11/1983 | Scoggins et al. | |
| 4,451,640 A | 5/1984 | Shiiki et al. | |
| 4,495,332 A | 1/1985 | Shiiki et al. | |
| 4,500,706 A | 2/1985 | Mathis et al. | |
| 4,501,902 A | 2/1985 | Cleary | |
| 4,514,558 A | 4/1985 | Shiiki et al. | |
| 4,529,818 A * | 7/1985 | Nesheiwat | C07C 227/22 562/553 |
| 4,535,117 A | 8/1985 | Mathis et al. | |
| 4,537,953 A | 8/1985 | Kawakami et al. | |
| 4,613,654 A | 9/1986 | Katto et al. | |
| 4,645,826 A | 2/1987 | Iizuka et al. | |
| 4,699,975 A | 10/1987 | Katto et al. | |
| 4,734,484 A | 3/1988 | Alfes et al. | |
| 4,740,569 A | 4/1988 | Tieszen et al. | |
| 4,745,167 A | 5/1988 | Iizuka et al. | |
| 4,748,231 A | 5/1988 | Nesheiwat | |
| 4,767,841 A | 8/1988 | Goetz et al. | |
| 4,769,442 A | 9/1988 | Iwasaki et al. | |
| 4,786,711 A | 11/1988 | Senatore et al. | |
| 4,794,164 A | 12/1988 | Iwasaki et al. | |
| 4,795,671 A | 1/1989 | Shiiki et al. | |
| 4,812,539 A | 3/1989 | Iizuka et al. | |
| 4,814,430 A | 3/1989 | Iwasaki et al. | |
| 4,820,800 A | 4/1989 | Geibel et al. | |
| 4,820,801 A | 4/1989 | Inoue et al. | |
| 4,841,019 A | 6/1989 | Iwasaki et al. | |
| 4,931,516 A | 6/1990 | Iizuka et al. | |
| 4,960,861 A | 10/1990 | Kotera et al. | |
| 4,976,825 A | 12/1990 | Iwasaki et al. | |
| 5,008,368 A | 4/1991 | Nesheiwat | |
| 5,015,725 A | 5/1991 | Scoggins et al. | |
| 5,023,315 A | 6/1991 | Ceurvorst et al. | |
| 5,037,954 A | 8/1991 | Nesheiwat et al. | |
| 5,053,486 A | 10/1991 | Nesheiwat | |
| 5,071,944 A | 12/1991 | Cliffton et al. | |
| 5,077,374 A | 12/1991 | Cleary | |
| 5,086,163 A | 2/1992 | Scoggins et al. | |
| 5,089,596 A | 2/1992 | Clifton et al. | |
| 5,089,597 A | 2/1992 | Nesheiwat et al. | |
| 5,093,468 A | 3/1992 | Kohler | |
| 5,110,902 A | 5/1992 | Scoggins et al. | |
| 5,126,430 A | 6/1992 | Senga et al. | |
| 5,128,445 A | 7/1992 | Scoggins et al. | |
| 5,134,224 A | 7/1992 | Nesheiwat et al. | |
| 5,145,946 A | 9/1992 | Fujii et al. | |
| 5,155,207 A | 10/1992 | Senatore et al. | |
| 5,179,194 A | 1/1993 | Kawakami et al. | |
| 5,194,580 A | 3/1993 | Koyama et al. | |
| 5,235,032 A | 8/1993 | Geibel et al. | |
| 5,241,043 A | 8/1993 | Senga | |
| 5,266,680 A | 11/1993 | Reed | |
| 5,278,283 A | 1/1994 | Miyoshi et al. | |
| 5,280,104 A | 1/1994 | Geibel et al. | |
| 5,296,579 A | 3/1994 | Geibel et al. | |
| 5,314,972 A | 5/1994 | Nesheiwat et al. | |
| 5,328,980 A | 7/1994 | Decker et al. | |
| 5,334,701 A | 8/1994 | Ash et al. | |
| 5,342,920 A | 8/1994 | Imai et al. | |
| 5,350,833 A | 9/1994 | Inoue et al. | |
| 5,352,768 A | 10/1994 | Stuber et al. | |
| 5,354,841 A | 10/1994 | Geibel et al. | |
| 5,364,928 A | 11/1994 | Ash | |
| 5,438,115 A | 8/1995 | Fahey et al. | |
| 5,440,009 A | 8/1995 | Ash et al. | |
| 5,475,081 A | 12/1995 | Imai et al. | |
| 5,618,981 A | 4/1997 | Shaw | |
| 5,635,587 A | 6/1997 | Koyama et al. | |
| 5,688,908 A | 11/1997 | Haubs et al. | |
| 5,696,282 A | 12/1997 | Shaw et al. | |
| 5,744,576 A | 4/1998 | Miyahara et al. | |
| 5,756,654 A | 5/1998 | Sase et al. | |
| 5,777,069 A | 7/1998 | Tsuda et al. | |
| 5,780,583 A | 7/1998 | Lubowitz et al. | |
| 5,789,533 A | 8/1998 | Yamanaka et al. | |
| 5,804,076 A | 9/1998 | Yamasaki et al. | |
| 5,840,830 A | 11/1998 | Miyahara et al. | |
| 5,856,433 A | 1/1999 | Koyama et al. | |
| 5,894,072 A | 4/1999 | Haubs et al. | |
| 5,898,061 A | 4/1999 | Sase et al. | |
| 5,905,137 A | 5/1999 | Haubs et al. | |
| 5,929,203 A | 7/1999 | Ash et al. | |
| 6,201,097 B1 | 3/2001 | Geibel et al. | |
| 6,201,098 B1 | 3/2001 | Haubs et al. | |
| 6,242,501 B1 | 6/2001 | Green et al. | |
| 6,281,326 B1 | 8/2001 | Ash et al. | |
| 6,331,608 B1 | 12/2001 | Vidaurri et al. | |
| 6,337,062 B1 | 1/2002 | Akiba | |
| 6,350,852 B1 | 2/2002 | Haubs et al. | |
| 6,388,003 B1 | 5/2002 | Okamoto et al. | |
| 6,538,102 B1 | 3/2003 | Haubs et al. | |
| 6,562,900 B2 | 5/2003 | Okamoto et al. | |
| 6,566,488 B2 | 5/2003 | Okamoto et al. | |
| 6,600,009 B2 | 7/2003 | Inoue et al. | |
| 6,646,105 B2 | 11/2003 | Shirota | |
| 6,734,282 B1 | 5/2004 | Wagener et al. | |
| 6,743,890 B2 | 6/2004 | Bando | |
| 6,750,319 B2 | 6/2004 | Koyama | |
| 6,818,132 B2 | 11/2004 | Haubs et al. | |
| 6,939,942 B2 | 9/2005 | Shirota | |
| 6,982,312 B2 | 1/2006 | Senga et al. | |
| 7,018,574 B2 | 3/2006 | Koyama | |
| 7,026,439 B2 | 4/2006 | Senga et al. | |
| 7,094,867 B2 | 8/2006 | Miyahara et al. | |
| 7,115,704 B2 | 10/2006 | Horiuchi et al. | |
| 7,220,817 B2 | 5/2007 | Matsuzaki et al. | |
| 7,312,300 B2 | 12/2007 | Mitchell | |
| 7,317,072 B2 | 1/2008 | Senga et al. | |
| 7,432,339 B2 | 10/2008 | Mitchell | |
| 7,501,111 B2 | 3/2009 | Keller et al. | |
| 7,504,476 B2 | 3/2009 | Kawama et al. | |
| 7,517,946 B2 | 4/2009 | Sato et al. | |
| 7,569,656 B2 | 8/2009 | Kagoshima et al. | |
| 7,632,915 B2 | 12/2009 | Sato et al. | |
| 7,655,748 B2 | 2/2010 | Sato et al. | |
| 7,750,111 B2 | 7/2010 | Horiuchi et al. | |
| 7,754,795 B2 | 7/2010 | Hintzer et al. | |
| 7,754,848 B2 | 7/2010 | Sato et al. | |
| 7,767,783 B2 | 8/2010 | Kawama et al. | |
| 7,834,133 B2 | 11/2010 | Suzuki et al. | |
| 8,076,423 B2 | 12/2011 | Ishio et al. | |
| 8,076,447 B2 | 12/2011 | Sato et al. | |
| 8,138,302 B2 | 3/2012 | Sato et al. | |
| 8,183,336 B2 | 5/2012 | Sato et al. | |
| 8,211,997 B2 | 7/2012 | Matsuzaki et al. | |
| 8,263,734 B2 | 9/2012 | Fodor et al. | |
| 8,329,832 B2 | 12/2012 | Horiuchi et al. | |
| 8,426,552 B2 | 4/2013 | Hinokimori et al. | |
| 8,440,784 B2 | 5/2013 | Kaiho et al. | |
| 8,445,629 B2 | 5/2013 | Hinokimori et al. | |
| 8,530,605 B2 | 9/2013 | Konno et al. | |
| 8,546,518 B2 | 10/2013 | Unohara et al. | |
| 8,609,790 B2 | 12/2013 | Suzuki et al. | |
| 8,680,230 B2 | 3/2014 | Konno et al. | |
| 8,883,959 B2 | 11/2014 | Hinokimori | |
| 8,921,513 B2 | 12/2014 | Luo et al. | |
| 8,981,041 B2 | 3/2015 | Kimura et al. | |
| 9,068,047 B2 | 6/2015 | Ichinose et al. | |
| 9,074,048 B2 | 7/2015 | Kim et al. | |
| 9,096,723 B2 | 8/2015 | Ichinose et al. | |
| 9,187,641 B2 | 11/2015 | Ouchiyama et al. | |
| 9,255,350 B2 | 2/2016 | Taniguchi et al. | |
| 9,339,778 B2 | 5/2016 | Koizumi et al. | |
| 9,388,283 B2 | 7/2016 | Chiong et al. | |
| 9,403,948 B2 | 8/2016 | Chiong et al. | |
| 2004/0164443 A1 | 8/2004 | Koyama | |
| 2005/0171332 A1 | 8/2005 | Koyama | |

(56) References Cited

U.S. PATENT DOCUMENTS

| | | | |
|---|---|---|---|
| 2010/0137531 A1* | 6/2010 | Horiuchi | C08G 75/0213 525/537 |
| 2010/0163499 A1 | 7/2010 | Odueyungbo | |
| 2011/0319587 A1 | 12/2011 | Hinokimori | |
| 2013/0068256 A1 | 3/2013 | Kobayashi et al. | |
| 2013/0253147 A1* | 9/2013 | Ichinose | C08G 75/02 525/537 |
| 2013/0317159 A1 | 11/2013 | Geibel et al. | |
| 2015/0065664 A1 | 3/2015 | Konno et al. | |
| 2015/0087776 A1 | 3/2015 | Chiong et al. | |
| 2015/0087777 A1 | 3/2015 | Chiong et al. | |
| 2015/0087778 A1 | 3/2015 | Chiong et al. | |
| 2015/0087779 A1* | 3/2015 | Chiong | C08G 75/16 524/609 |
| 2015/0087805 A1 | 3/2015 | Nekkanti et al. | |
| 2015/0175748 A1 | 6/2015 | Fodor et al. | |
| 2015/0376339 A1* | 12/2015 | Fodor | B32B 9/00 528/388 |
| 2016/0244567 A1 | 8/2016 | Nekkanti et al. | |
| 2016/0244569 A1 | 8/2016 | Chiong | |
| 2016/0280859 A1 | 9/2016 | Chiong | |

FOREIGN PATENT DOCUMENTS

| | | |
|---|---|---|
| JP | S58125721 | 7/1983 |
| JP | S59168032 | 9/1984 |
| JP | S6055029 | 3/1985 |
| JP | S60235838 | 11/1985 |
| JP | S61228023 | 10/1986 |
| JP | S62285922 | 12/1987 |
| JP | H0280432 | 3/1990 |
| JP | H02160834 | 6/1990 |
| JP | H02302436 | 12/1990 |
| JP | H05271414 | 10/1993 |
| JP | H06145355 | 5/1994 |
| JP | H0649762 | 6/1994 |
| JP | H07118389 | 5/1995 |
| JP | H07228699 | 8/1995 |
| JP | H07242746 | 9/1995 |
| JP | H07292107 | 11/1995 |
| JP | H07330911 | 12/1995 |
| JP | H0841201 | 2/1996 |
| JP | H08100064 | 4/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000191785 | 7/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 1 837 359 | 9/2007 |
| JP | 2007314803 | 12/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |

OTHER PUBLICATIONS

International Search Report and Written Opinion for PCT/US16/17082, dated Apr. 11, 2016, 10 pages.
Related U.S. Patent Applications Form.
Fahey et al., Poly(p-phenylene sulfide) Synthesis: A Step-Growth Polymerization with Unequal Step Reactivity, *Macromolecules* 1997, pp. 387-393, 7 pages.

* cited by examiner

METHOD FOR FORMING A HIGH MOLECULAR WEIGHT POLYARYLENE SULFIDE

RELATED APPLICATIONS

The present application claims priority to U.S. Provisional Application Ser. No. 62/118,001, filed on Feb. 19, 2015; Ser. No. 62/197,637, filed on Jul. 28, 2015; and Ser. No. 62/206,135 filed on Aug. 17, 2015, which are incorporated herein in their entirety by reference thereto.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent. During recovery of the high molecular weight polyarylene sulfide product, a portion is also collected that contains low molecular weight and cyclic arylene sulfide oligomers. This portion is often referred to as "slime" due to its undesirable physical characteristics. As such, a need currently exists for a technique of using this portion to form high molecular weight polyarylene sulfides.

SUMMARY OF THE INVENTION

In accordance with one embodiment of the present invention, a method for forming a polyarylene sulfide is disclosed. The method comprises supplying a waste composition to a vessel, the waste composition containing arylene sulfide byproducts. The arylene sulfide byproducts are heated to a temperature of from about 260° C. to about 285° C. in the presence of a sulfur reactant, thereby forming a high molecular weight polyarylene sulfide having a number average molecular weight of about 2,000 Daltons or more.

In accordance with another embodiment of the present invention, a method for forming a polyarylene sulfide is disclosed. The method comprises forming a SMAB-NaSH complex within a first vessel; supplying the SMAB-NaSH complex and a dihaloaromatic monomer to a second vessel to form a prepolymer; and supplying the prepolymer and a dihaloaromatic monomer to a third vessel. A waste composition is also supplied to the third vessel that contains arylene sulfide byproducts. The arylene sulfide byproducts are heated to a temperature of from about 260° C. to about 285° C., thereby forming a high molecular weight polyarylene sulfide having a number average molecular weight of about 2,000 Daltons or more.

BRIEF DESCRIPTION OF THE FIGURES

The present disclosure may be better understood with reference to the figures in which.

DETAILED DESCRIPTION

Figure 1:
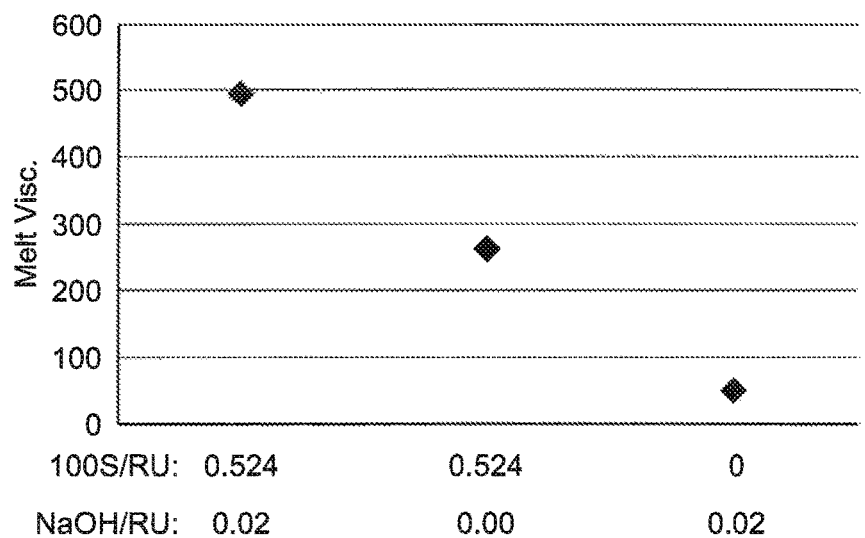
FIG. 1 illustrates the melt viscosity of polyarylene sulfide product obtained for several different samples with respect to the molar ratio of reactants.

It is to be understood by one of ordinary skill in the art that the present discussion is a description of exemplary embodiments only, and is not intended as limiting the broader aspects of the present invention.

Generally speaking, the present invention is directed to a method for forming a high molecular weight polyarylene sulfide from a waste composition, which is a byproduct of a polymerization process for forming polyarylene sulfides. For example, the waste composition may be a filter cake that is obtained after a polyarylene sulfide is washed. The filter cake may be in the form of a slurry having a solid phase and a liquid phase. The solid phase typically constitutes a relatively high portion of the slurry, such as from about 30 wt. % to about 80 wt. %, in some embodiments from about 35 wt. % to about 70 wt. %, and in some embodiments, from about 40 wt. % to about 60 wt. %. The liquid phase may likewise constitute from about 20 wt. % to about 70 wt. %, in some embodiments from about 30 wt. % to about 65 wt. %, and in some embodiments, from about 40 wt. % to about 60 wt. % of the slurry. The liquid phase generally contains a relatively high percentage of water, such as from about 50 wt. % to about 99.999 wt. %, in some embodiments from about 60 wt. % to about 99.99 wt. %, and in some embodiments, from about 70 wt. % to about 99.9 wt. % of the liquid phase. Volatile organic impurities may also be present in the liquid phase, such as in an amount of from about 20 to about 10,000 parts per million ("ppm"), in some embodiments about 50 to about 5,000 ppm, and in some embodiments, from about 100 to about 3,500 ppm. Such volatile impurities generally have a relatively high boiling point, such as greater than about 100° C., in some embodiments about 120° C. or more, and in some embodiments, from about 150° C. to about 500° C., as determined at atmospheric pressure. Examples of such compounds may include, for instance, 2-pyrrolidone, phenol, mesityl oxide, diacetyl acetone, p-dichlorobenzene, thiophenol, methylthioanisole, etc. The term "impurities" is meant to exclude any specific reactants or solvents employed during polymerization of the polyarylene sulfide, such as N-methylpyrrolidone.

The waste composition contains reaction arylene sulfide byproducts of a polymerization process for forming a high molecular weight polyarylene sulfides. Such components are typically present in the solid phase of the filter cake. Examples of such byproducts include, for instance, low molecular weight arylene sulfide oligomers, fine polyarylene sulfide particles, and/or cyclic polyarylene sulfides. The arylene sulfide byproducts of the waste composition can generally have a relatively low melt viscosity, for instance about 200 poise or less or about 100 poise or less in some embodiments as determined in accordance with ISO Test No. 11443 (technically equivalent to ASTM D3835) at a shear rate of 1200 s-1 and at a temperature of about 310° C. using a Dynisco 7001 capillary rheometer. The arylene sulfide byproducts can generally have a chlorine end group content of from about 0.2 wt. % to about 0.7 wt. % of the weight of the arylene sulfide byproducts. Other byproducts that may be present include unreacted monomers, salts, side reaction byproducts, etc. Low molecular weight arylene sulfide oligomers, fine polyarylene sulfide particles, and cyclic polyarylene sulfides can, for instance, each constitute from about 0.1 wt. % to about 50 wt. % of the composition.

As used herein, a "low molecular weight" oligomer typically refers to an arylene sulfide having a number average molecular weight of less than about 2,000 Daltons, in some embodiments about 1,500 Daltons or less, and in some embodiments, from about 100 to about 1,000 Daltons. The polydispersity index is relatively high, such as above about 7, in some embodiments about 9 or more, and in some embodiments, from about 10 to about 20. The weight average molecular weight may likewise be about less than about 20,000 Daltons, in some embodiments about 15,000 Daltons or less, and in some embodiments, from about 1,000 to about 12,000 Daltons. Conversely, a "high molecular weight" polyarylene sulfide typically refers to a polyarylene sulfide having a number average molecular weight of from about 2,000 Daltons or more, in some embodiments about 3,000 Daltons or more, and in some embodiments, from about 5,000 to about 50,000 Daltons. While having a high molecular weight, the polydispersity index (weight average molecular weight divided by the number average molecular weight) is relatively low. For instance, the polydispersity index of the polyarylene sulfide may be about 7 or less, in some embodiments about 6 or less, and in some embodiments, from about 2 to about 5. The weight average molecular weight may likewise be about 20,000 Daltons or more, in some embodiments about 22,000 Daltons or more, and in some embodiments, from about 25,000 to about 100,000 Daltons.

Fine polyarylene sulfide particles may also be present in the waste composition. Such particles typically have an average particle size (e.g., diameter) of about 100 micrometers or less, in some embodiments about 50 micrometers or less, and in some embodiments, about 20 micrometers or less. For instance, particle sizes can range from about 15 micrometers or less to about 400 micrometers. In one embodiment, the particles can have a particle size distribution $D_{50}$ of about 20 micrometers or less (i.e., about 50% of the particles can have a size of about 20 microns or less), a $D_{10}$ of about 5 micrometers or less, a $D_{25}$ of about 10 micrometers or less, a $D_{75}$ of about 90 micrometers or less, and a $D_{90}$ of about 160 micrometers or less.

Cyclic polyarylene sulfides may also be present, which typically have the following general formula:

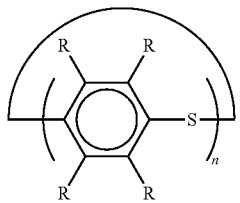

wherein, n is from 4 to 30; and

R is independently hydrogen, alkyl, cycloalkyl, aryl, alkylaryl, or an arylalkyl radical having from about 6 to about 24 carbon atoms.

The arylene sulfide byproducts can exhibit a multimodal molecular weight distribution due to, e.g., significant portions of arylene sulfide oligomers and cyclic polyarylene sulfides in the solids of the waste stream. In general, the waste composition can vary depending upon the product formation process from which the waste slurry is obtained. For instance, in those embodiments in which the waste composition is obtained from a process in which a relatively low melt viscosity polyarylene sulfide is being formed (e.g., a polyarylene sulfide product having a melt viscosity of from about 200 poise to about 700 poise), the arylene sulfide byproducts of the waste composition can exhibit a bimodal molecular weight distribution with a higher proportion of high molecular weight arylene sulfides in the waste composition. In comparison, when treating a waste composition from a process designed to produce a higher melt viscosity polyarylene sulfide (e.g., from about 2400 poise to about 2600 poise), the waste composition can exhibit a bimodal molecular weight distribution with a relatively higher proportion of low molecular weight arylene sulfides in the waste composition. Of course, process conditions of the formation process can cause variations in the waste composition as well.

In accordance with the present invention, these components can be converted into a high molecular weight polyarylene sulfide through the use of a unique process. More particularly, the waste composition may be supplied to a vessel, such as a reactor vessel, column, etc. If desired, an organic amide solvent may be mixed with the waste composition to reduce its viscosity, thereby creating a composition that is more flowable. Exemplary organic amide solvents may include, for instance, N-methyl-2-pyrrolidone ("NMP"), N-ethyl-2-pyrrolidone, N,N-dimethylformamide, N,N-dimethylacetamide, N-methylcaprolactam, tetramethylurea, dimethylimidazolidinone, hexamethyl phosphoric acid triamide, etc., as well as mixtures thereof.

Although not required, the waste composition may be optionally subjected to a dehydration process in which it is heated in one or more steps to a temperature that is greater than the boiling point of water in the composition, as determined at the pressure of the vessel (e.g., atmospheric pressure). For example, the composition may be heated to a temperature of from about 100° C. to about 220° C., in some embodiments, from about 120° C. to about 215° C., and in some embodiments, from about 150° C. to about 210° C. The heating rate may range from about 0.5° C. to about 5.0° C. per minute, and in some embodiments, from about 1.0° C. to about 3.0° C. per minute. When heated in this manner, excess water may be vaporized and extracted from the composition. Simultaneously, the volatile organic impurities may also be co-distilled and removed with the extracted water, which helps to purify the composition and enable it to be more readily recycled back into a polymerization process. This co-distillation process may leave a solids portion containing the arylene sulfide byproducts and other impurities, such as described above.

Following any optional dehydration, the arylene sulfide byproducts (e.g., low molecular weight oligomers, fines, and/or cyclic components) are reacted with a sulfur reactant to form a high molecular weight polyarylene sulfide. The sulfur reactant may already be present in the waste composition. Likewise, a separate sulfur reactant may also be supplied to the vessel. Suitable sulfur reactants may include alkali metal sulfides, alkali metal hydrogen sulfides, alkali metal sulfide hydrates, complexes of the foregoing, etc. The alkali metal sulfide may be, for example, lithium sulfide, sodium sulfide, potassium sulfide, rubidium sulfide, cesium sulfide or a mixture thereof. The sulfur reactant may also be generated in situ. For instance, an alkali metal sulfide hydrate (e.g., sodium sulfide hydrate) may be formed within the vessel from an alkali metal hydrogen sulfide (e.g., sodium hydrogen sulfide) and an alkali metal hydroxide (e.g., sodium hydroxide). When a combination of alkali metal hydrogen sulfide and alkali metal hydroxide are fed to the reactor to form the alkali metal sulfide, the molar ratio of alkali metal hydroxide to alkali metal hydrogen sulfide may be between about 0.80 and about 1.50. For instance, the molar ratio of alkali metal hydroxide to sulfur repeating units of the polyarylene sulfide formed can be about 1 or less, i.e., from 0 to about 1, or from 0 to about 0.5 in some embodiments.

Another suitable sulfur reactant is a complex known was "SMAB-NaSH", which is formed from the reaction by reacting a sulfur source (e.g., sodium sulfide, sodium hydrosulfide, etc.) and an organic amide solvent in the presence of water. One example of a reaction scheme for forming a SMAB-NaSH complex by reacting sodium sulfide with NMP in the presence of water is set forth below:

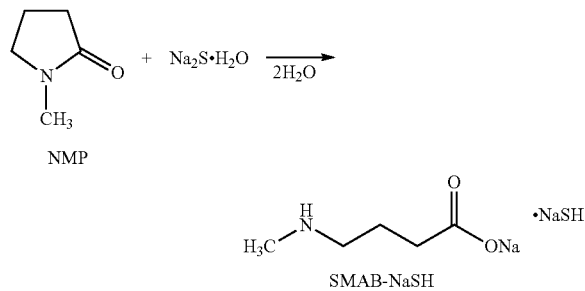

If desired, the SMAB-NaSH complex may be pre-formed in an earlier stage of the polymerization process. Alternatively, the complex may also be formed in situ within the vessel by supplying the sulfur source (e.g., sodium hydrosulfide), organic amide solvent, and water thereto. The molar ratio of organic amide solvent to the sulfur source in the feed may, for instance, be from about 2 to about 10, or from about 3 to about 5, and the molar ratio of water to the sulfur source in the feed may be from about 0.5 to about 4, or from about 1.5 to about 3. In this manner, the SMAB-NaSH complex within the vessel and can then react with the low molecular weight oligomers and cyclic polyarylene sulfides within the waste composition. In general, the molar ratio of the sulfur source to the sulfur repeating units of the polyarylene sulfide can be about 1 or less, for instance from about 0 to 1 or from about 0.4 to about 0.7 in some embodiments, and the molar ratio of water to the sulfur repeating units of the polyarylene sulfide can be from about 1.5 to about 3.

The sulfur reactant can directly convert the low molecular oligomers, fines, and cyclic polyarylene sulfides into the desired high molecular weight polyarylene sulfide without the need for any ongoing active polymerization. Of course, this is by no means required. In fact, in certain embodiments, it may be desired to supply a dihaloaromatic reactant to the vessel so that the desired conversion occurs simultaneously with an active polymerization process. The dihaloaromatic reactant may be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic reactants may be used either singly or in any combination thereof. Specific examples of such dihaloaromatic compounds may include p-dichlorobenzene ("pDCB"), m-dichlorobenzene, o-dichlorobenzene, 2,5-dichlorotoluene, 1,4-dibromobenzene, 1,4-dichloronaphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenylsulfone, 4,4'-dichlorodiphenylsulfoxide, 4,4'-dichlorodiphenyl ketone, etc. The halogen atom may be fluorine, chlorine, bromine or iodine, and two halogen atoms in the same dihaloaromatic reactant may be the same or different from each other. In one embodiment, o-dichlorobenzene, m-dichlorobenzene, p-dichlorobenzene or a mixture of two or more compounds thereof may be employed. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide. The amount of the dihaloaromatic reactant per mole of the effective amount of the sulfur reactant may generally be from about 0.8 to about 2.0 moles, in some embodiments from about 1.0 to about 1.8 moles, and in some embodiments, from about 1.1 to about 1.6 moles.

Regardless of the particular reactants that are employed, the reaction mixture, which includes the sulfur reactant (e.g., SMAB-NaSH, NaSH, etc.), optional dihaloaromatic reactant (e.g., pDCB), and other optional components (e.g., alkali metal hydroxide), is subjected to a heating process. Heating may occur at a temperature of from about 260° C. to about 285° C., in some embodiments from about 265° C. to about 285° C., and in some embodiments, from about 270° C. to about 280° C., and at a rate of from about 0.5° C. to about 8.0° C. per minute, in some embodiments from about 1° C. to about 7° C. per minute, and in some embodiments, from about 1° C. to about 5° C. per minute. If desired, water may also be added to facilitate phase separation. The pressure within the vessel may vary, but is typically held at or near atmospheric pressure. To help maintain the desired pressure conditions, vapor may be removed from the reactor, which can include water and a hydrogen sulfide by-product.

Heating may be conducted in a single stage or in multiple stages. In one embodiment, for instance, a multi-stage heating process is employed. During a first stage of the heating process, for instance, the reaction mixture may be heated to a temperature that is sufficient to convert any cyclic polyarylene sulfides into linear oligomers, which may have the following general structure:

$$X\!\!-\!\!\left(\!\!\!\begin{array}{c}\phantom{x}\\ \phantom{x}\end{array}\!\!\!-\!\!S\!\right)_{\!\!p}\!\!-\!Y$$

wherein,
p is from 1 to 50; and
X and Y are independently end-groups occurring as by-products of the polymerization, such as hydrogen, halogen, halogenated phenyl, thiol, phenoxy, hydroxyl, mercaptan group, cyclic amide, amine, or a salt of any of the foregoing.

When employed, the dihaloaromatic reactant (e.g., pDCB) may also be converted into a low molecular weight oligomer during this stage and any fines may increase in molecular weight and particle size. In any event, during the first heating stage, the reaction mixture is typically heated to a temperature of from about 235° C. to about 260° C., in some embodiments from about 235° C. to about 265° C., in some embodiments from about 240° C. to about 260° C., and in some embodiments, from about 245° C. to about 265° C., and at a rate of from about 0.1° C. to about 3.0° C. per minute, in some embodiments from about 0.2° C. to about 1.5° C. per minute, and in some embodiments, from about 0.5° C. to about 1° C. per minute. Once the first stage is complete, the reaction mixture is subjected to a second heating stage, such as within the ranges described above. During this stage, the reaction mixture is heated for a period of time and held a temperature that is sufficient such that the oligomers are converted into a high molecular weight polyarylene sulfide. For instance, the reaction mixture is held at a temperature for a period of time of about one hour or greater in some embodiments, about 10 hours or less in some embodiments, or from about two hours to about five hours in some embodiments.

Once formed, the high molecular weight polyarylene sulfide may be cooled to precipitate the polymer into a granular form. Cooling may occur within the vessel or in a separate vessel, and may occur in one or multiple stages. In one embodiment, the polymer is cooled to a temperature of from about 50° C. to about 100° C., in some embodiments from about 60° C. to about 95° C., and in some embodiments, from about 70° C. to about 90° C. The cooled polymer may also be washed with one or more washing solutions and thereafter dried to form the final product. The washing solution(s) typically contain a solvent, which may be water and/or an organic solvent. Particularly suitable organic solvents include, for instance, halogen-containing solvents (e.g., methylene chloride, 1-chlorobutane, chlorobenzene, 1,1-dichloroethane, 1,2-dichloroethane, chloroform, and 1,1,2,2-tetrachloroethane); ether solvents (e.g., diethyl ether, tetrahydrofuran, and 1,4-dioxane); ketone solvents (e.g., acetone and cyclohexanone); ester solvents (e.g., ethyl acetate); lactone solvents (e.g., butyrolactone); carbonate solvents (e.g., ethylene carbonate and propylene carbonate); amine solvents (e.g., triethylamine and pyridine); nitrile solvents (e.g., acetonitrile and succinonitrile); amide solvents (e.g., N,N'-dimethylformamide, N,N'-dimethylacetamide, tetramethylurea and N-methylpyrrolidone); nitro-containing solvents (e.g., nitromethane and nitrobenzene); sulfide solvents (e.g., dimethylsulfoxide and sulfolane); and so forth. The temperature of the washing solution(s) may be from about 10° C. to about 150° C., in some embodiments from about 15° C. to about 120° C., in some embodiments from about 20° C. to about 100° C. The manner in which the polyarylene sulfide is contacted with the washing solution may vary as desired. In one embodiment, for instance, a system may be employed in which the polyarylene sulfide is contacted with the washing solution within a vessel, such as a bath, sedimentation column, etc.

The resulting high molecular weight polyarylene sulfide generally has repeating units of the formula:

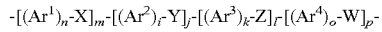

wherein,
Ar$^1$, Ar$^2$, Ar$^3$, and Ar$^4$ are independently arylene units of 6 to 18 carbon atoms;
W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—; and
n, m, i, j, k, l, o, and p are independently 0, 1, 2, 3, or 4, subject to the proviso that their sum total is not less than 2.

The arylene units Ar$^1$, Ar$^2$, Ar$^3$, and Ar$^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be a homopolymer or copolymer. For instance, selective combination of dihaloaromatic compounds may result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer may be formed containing segments having the structure of formula:

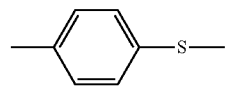

and segments having the structure of formula:

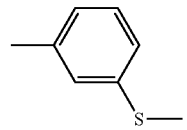

or segments having the structure of formula:

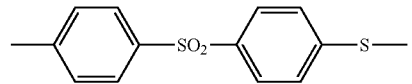

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups.

The high molecular weight polyarylene sulfide can exhibit other beneficial characteristics as well. For instance, the melt viscosity of the neat polymer (i.e., no additives) as determined according to ISO Test No. 11443 at 310° C. and 1,200/seconds can be about 6000 poise or less, for instance about 2000 poise or less, or about 1500 poise or less in some embodiments. In one embodiment, the polyarylene sulfide can have a relatively low melt viscosity, for instance a melt viscosity of about 1000 poise or less or about 750 poise or less in some embodiments. For instance, the polyarylene sulfide can have a melt viscosity of from about 50 poise to about 700 poise, from about 100 poise to about 650 poise, or from about 200 poise to about 500 poise in some embodiments.

The waste composition can be converted into a high molecular weight using a process that is either separate from a polymerization process or integrated into the polymerization process, such as by being recycled back into the process and converted in situ. Although by no means required, one such polymerization process may be a multi-stage process that includes at least two separate formation stages, one or more of which may include the waste composition as a feed for conversion into a higher molecular weight product.

In one embodiment, a first vessel may be employed for a first stage of the process during which an organic amide solvent and sulfur source react to form a SMAB-NaSH complex as described above. For instance, the feed to the first reactor may include sodium sulfide ($Na_2S$) (which may be in the hydrate form), N-methyl-2-pyrrolidone (NMP) and water. Once formed, the SMAB-NaSH complex may then be fed to a second reactor in combination with a dihaloaromatic monomer (e.g., pDCB) and optionally an organic solvent (e.g., NMP) to form a prepolymer mixture as a second stage of the process, which may include the prepolymer, the solvent, and one or more salts that are formed as a by-product of the polymerization reaction. If desired, at least a portion of the salts in the prepolymer mixture may be removed, such as with a screen, sieve, or other suitable filter. In any event, the prepolymer is fed to a third reactor where additional polymerization may occur. This may be accomplished by adding a dihaloaromatic monomer (e.g., pDCB), sulfur source, and optionally an organic solvent (e.g., NMP) to the third reactor in combination with the prepolymer. The sulfur source may be a monomer (e.g., alkali metal sulfide) or it may include a portion of the SMAB-NaSH complex formed in the first reactor. If desired, the waste composition (e.g., filter cake) obtained after washing may also be recycled back into the third vessel so that it can be converted into a high molecular weight polyarylene sulfide in accordance with the process of the present invention. More particularly, the waste composition may be subjected to an optional dehydration step, and thereafter optionally heated during a first stage to a temperature of from about 235° C. to about 260° C. and ultimately heated to a temperature of from about 260° C. to about 285° C. in the presence of a sulfur reactant, thereby forming a high molecular weight polyarylene sulfide. Following any desired post-formation processing, the polyarylene sulfide may be discharged, typically through an extrusion orifice fitted with a die of desired configuration, cooled, washed, and collected.

The present invention may be better understood with reference to the following example.

Test Methods

Molecular Weight:

A sample of PPS may be initially converted to PPSO by oxidation with a mixture of cold $HNO_3$ (50%) in a trifluoroacetic acid mixture. The resulting PPSO may be dissolved in warm hexafluoroisopropanol (HFIP) for 1 hour and then analyzed for molecular weight by GPC equipped with PSS-hexafluoroisopropanol (HFIP) gel columns. The gel columns may be fitted with an HFIP-gel guard column using HFIP as mobile phase and refractive index (RI) as detector.

Melt Viscosity:

The melt viscosity may be determined as scanning shear rate viscosity and determined in accordance with ISO Test No. 11443 (technically equivalent to ASTM D3835) at a shear rate of 1200 $s^{-1}$ and at a temperature of about 310° C. using a Dynisco 7001 capillary rheometer. The rheometer orifice (die) may have a diameter of 1 mm, a length of 20 mm, an L/D ratio of 20.1, and an entrance angle of 180°. The diameter of the barrel may be 9.55 mm+0.005 mm and the length of the rod was 233.4 mm. Prior to measurement, samples are dried in a vacuum oven for 1.5 hours at 150° C.

Crystallization Temperature:

The crystallization temperature may be determined by differential scanning calorimetry ("DSC") as is known in the art. Under the DSC procedure, samples are heated during a first heating cycle at a rate of 20° C. per minute to a temperature of 340° C., cooled at a rate of 20° C. per minute to a temperature of 50° C., and then heated during a second heating cycle at a rate of 20° C. per minute to a temperature of 340° C., and cooled again at a rate of 20° C. per minute to a temperature of 50° C. as stated in ISO Standard 10350 using DSC measurements conducted on a TA Q2000 Instrument. The temperature at the highest point of the exothermic curve obtained during the second heating cycle is generally referred to herein as the "crystallization temperature."

Oligomer Content:

The oligomer content of a sample may be determined by contacting the sample with an extraction solution that contains 100 wt. % chloroform at a temperature of 60° C. and pressure of 1,500 psi. The sample is rinsed twice with the extraction solution, and thereafter the extracted solvent is dried and the weight of the extractables is measured. The oligomer content is determined by dividing the weight of the extractables by the weight of the original sample, and then multiplying by 100.

Volatile Content:

The content of volatile organic impurities can be determined by extractive gas chromatographic analysis. More particularly, 3 grams of a sample may be extracted with 10 milliliters acetonitrile and then analyzed by gas chromatography using biphenyl as the internal standard.

EXAMPLE 1

Polyphenylene sulfide ("PPS") is polymerized from NaSH and pDCB and separated from the fines by a 100-micrometer screen filter. The portion having a size larger than 100 micrometers ("Granular PPS") is washed with acetone, water, and 0.5% acetic acid, washed again in water, dried in an oven, and then analyzed for molecular weight as described above. The portion having a size less than 100 micrometers ("PPS Fines") is washed with acetone, water, filtered through a paper filter to create a wet waste composition (solids content of 46%), and then measured for molecular weight as described above. Several batches are formed in this manner until about 200 grams of this portion are collected. The results are set forth below.

| Sample | Number Avg. MW (Daltons) | Weight Avg. MW (Daltons) | PDI |
| --- | --- | --- | --- |
| PPS Fines | 945 | 10,332 | 10.9 |
| Granular PPS | 7,536 | 31,571 | 4.2 |

434 grams of the PPS fines slurry (containing 200 grams of fines) is formed and found to contain between 10 to 10,000 ppm of volatile organic impurities. The slurry is charged into a 2-L titanium reactor followed with 743.0 grams of NMP and an additive as set forth in the table below. The reactor is sealed then heated to 100° C. at 3° C./min and then to 200° C. at 1° C./min. At around 110 to 115° C., dehydration commences until the reactor temperature reaches 200° C. The distillate is analyzed for water and found to contain all the water present in the starting slurry (quantitative dehydration). The content of the volatile organic impurities remaining in the reactor is less than 5 ppm.

Water is then added to the fines and heated to 265° C. for a period of time as indicated in the table below.

| Sample | Additive | H$_2$O: Mole Repeat Unit | Hold time |
|---|---|---|---|
| 1 | — | 1.5 to 3.0 | 1 hour |
| 2 | NaOH | 1.5 to 3.0 | 1 hour |
| 3 | NaOH/Na$_2$S | 1.5 to 3.0 | 1 hour |
| 4 | NaOH/Na$_2$S | 1.5 to 3.0 | 3 hours |

The reactor is cooled to 240° C. within 15 minutes, cooled to 200° C. within 80 minutes, and then cooled to 50° C. within 30 minutes. The slurry is recovered by shaking on a 106 micron screen and by washing (1:6, 2 minutes then drain) in the following sequence: acetone (4 times), water (4 times), 0.5% acetic acid (once), and water (twice). The resulting flakes are dried in vacuum oven at 105° C. for at least 9 hours. The flakes are analyzed for melt viscosity. The results are set forth below.

| Sample | Melt Viscosity (poise) |
|---|---|
| 1 | 46 |
| 2 | 240 |
| 3 | 209 |
| 4 | 220 |

EXAMPLE 2

Figure 4:
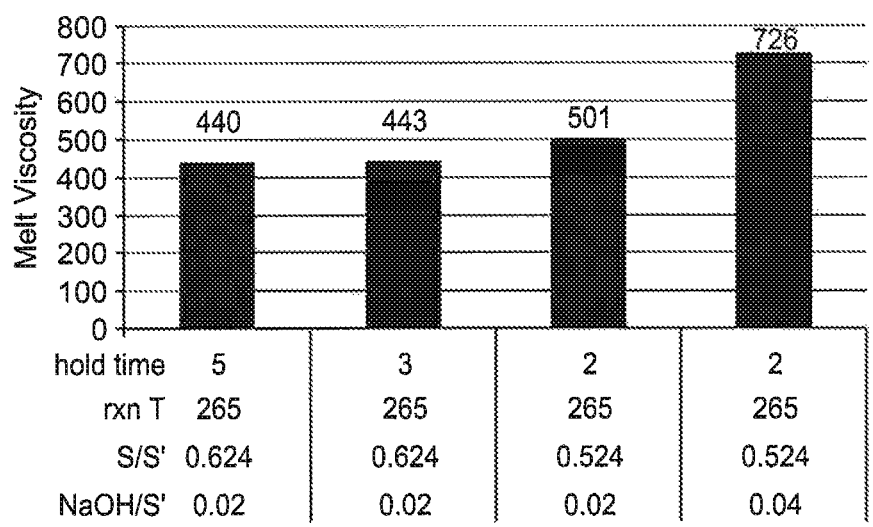
FIG. 4 illustrates the effect of reaction time and reactant concentration on melt viscosity of product polyarylene sulfide.

A 2 liter titanium pressure reactor was charged with NMP and PPS fines waste. The reactor was sealed and heated to 100° C. at 1-2° C./min then to 200° C. at 0.5 to 2° C./min to achieve a dehydrated mixture of PPS fines in NMP. A distillate containing about 22% NMP was collected and discarded. The reactor was cooled to room temperature and charged with additional NMP such that g NMP/mole repeat unit was equal to 375, water such that H$_2$O/mol repeat unit was equal to 3 and a pre-determined amount of sulfide in the form of Na$_2$S.9H$_2$O and pre-determined amount of NaOH. The reactor was sealed, purged with nitrogen and heated to 265° C. (1-2° C./min) and held at that temperature for a pre-determined time (2-5 hours as shown in FIG. 4). When the reaction time had been completed the temperature was allowed to cool down to room temperature at an average cooling rate of 0.5 to 1.5° C./min. The PPS was then recovered by screening through 100 micron, washing with acetone (2×600 ml), with water (5×600 ml), with 0.5% acetic acid (1×600 ml) and water (2×600 ml). The flakes were dried in a vacuum oven for at least 12 hours at 105 C.

FIG. 1 illustrates the melt viscosity obtained for several different samples with respect to the molar ratio of reactants in the sample. 100 S/RU refers to mole Na$_2$S.9H$_2$O/mole repeat unit×100 and NaOH/RU is mole NaOH/mole repeat unit.

Figure 2:
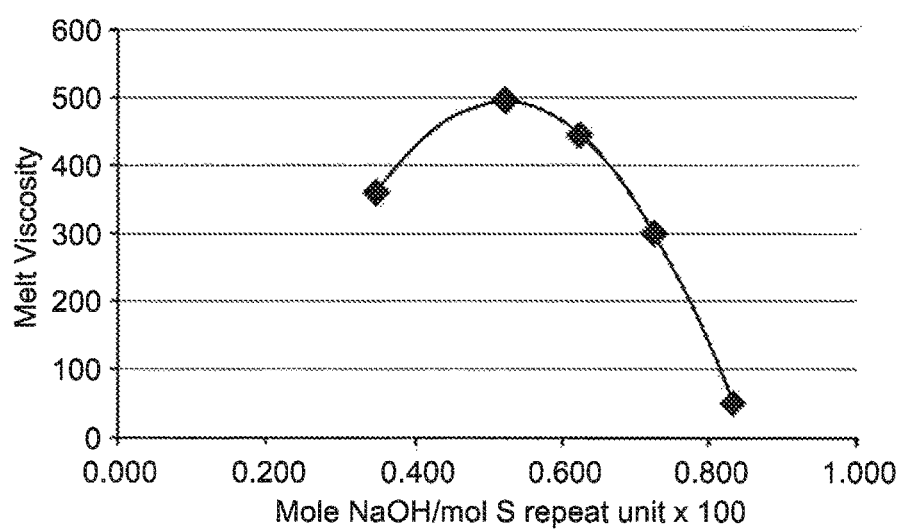
FIG. 2 illustrates the change in melt viscosity of polyarylene sulfide product obtained with change in proportions of sulfur and sodium hydroxide reactants.

Both the addition of sulfide and NaOH were shown to increase the melt viscosity of the PPS fines. If only NaOH was added to the reaction mixture a slight increase in MV was observed but not substantial. When only sulfide was added, an MV of 261 poise was observed. It appeared that sulfide was acting as a chain extension agent by reacting with the chlorine end group. However, by combining sulfide and NaOH to increase the melt viscosity, a higher MV was achieved as indicated in FIG. 2.

As shown, at mol NaOH/mol S repeat unit of 0.02, the melt viscosity increases with NaOH/mol S repeat unit of up to 0.5 and the MV drops beyond that. This observation can mean that beyond 0.5, the sulfide level may be higher than available reactive chloride and that the excess sulfide can react with the chain to affect a chain chopping reaction that result to lowering of MV.

Figure 3:
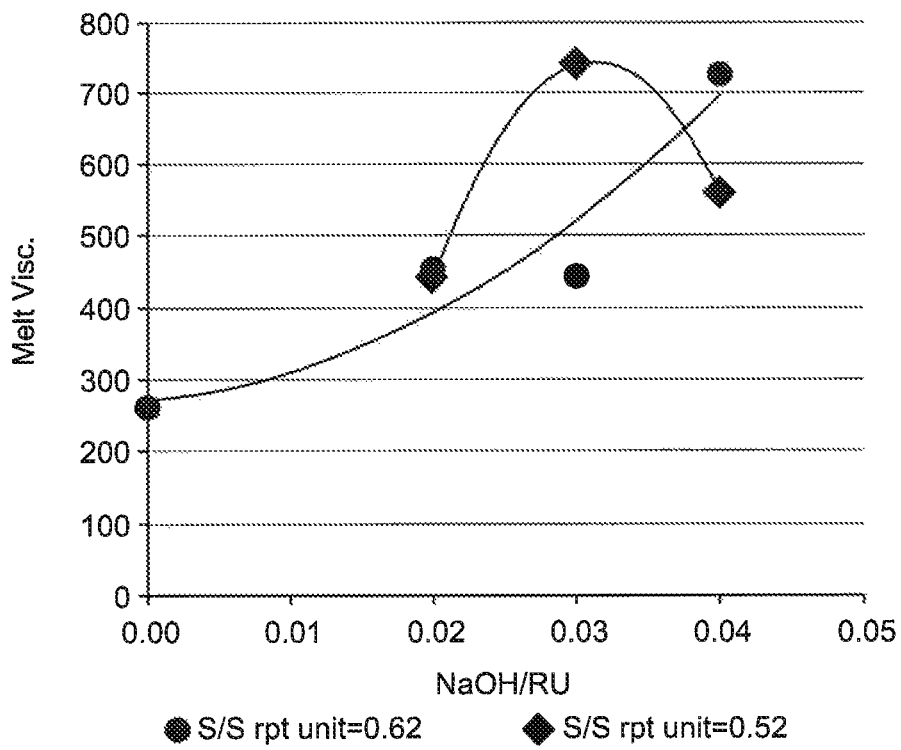
FIG. 3 illustrates the melt viscosity of polyarylene sulfide product obtained in two parallel sets of reactions; one set where S/S repeat unit×100=0.62 and the on the other in which S/S repeat unit×100=0.52 at different NaOH/mol S repeat unit.

The synergistic effect of sulfide and NaOH was demonstrated by conducting two parallel sets of reactions. One set where S/S repeat unit×100=0.62 and the on the other in which S/S repeat unit×100=0.52 at different NaOH/mol S repeat unit. As shown in FIG. 3, at 0.62, the MV increased with increasing NaOH/mol S repeat unit, while at 0.52, MV dropped after achieving a maximum MV at NaOH/mol S repeat unit of around 0.03.

The effect of reaction time was also examined. As illustrated in FIG. 4, at higher NaOH level, higher MV is possible for a shorter reaction time. At lower NaOH level, increasing the reaction time has little effect on MV. It is possible to use a lower sulfide level when NaOH level is high and achieve high MV with short time.

Particle size analysis of recovered PPS having MV=504 poise is shown in the table below. Results showed that the particle size distribution of the recovered fines was different than the initial PSD of the starting fines.

| | | |
|---|---|---|
| D$_5$ | 3273 | μm |
| D$_{50}$ | 968 | μm |
| D$_{90}$ | 302 | μm |

While particular embodiments of the present disclosure have been illustrated and described, it would be obvious to those skilled in the art that various other changes and modifications may be made without departing from the spirit and scope of the disclosure. It is therefore intended to cover in the appended claims all such changes and modifications that are within the scope of this disclosure.

What is claimed is:

1. A method for forming a polyarylene sulfide, the method comprising:
   supplying a waste composition that contains arylene sulfide byproducts to a vessel;
   supplying a sulfur reactant to the vessel;
   separately supplying an alkali metal hydroxide; and
   heating the arylene sulfide byproducts to a temperature of from about 260° C. to about 285° C. such that the molar ratio of alkali metal hydroxide to sulfur repeating units of the polyarylene sulfide is about 1 or less, thereby forming a high molecular weight polyarylene sulfide having a number average molecular weight of about 2,000 Daltons or more.

2. The method of claim 1, further comprising subjecting the waste composition to a dehydration step prior to heating to a temperature of from about 260° C. to about 285° C.

3. The method of claim 1, wherein the sulfur reactant is an alkali metal sulfide, alkali metal hydrogen sulfide, alkali sulfide hydrate, or a combination thereof.

4. The method of claim 1, wherein the sulfur reactant is a SMAB-NaSH complex.

5. The method of claim 1, wherein the heating also occurs in the presence of a dihaloaromatic reactant.

6. The method of claim 5, wherein the dihaloaromatic reactant is p-dichlorobenzene.

7. The method of claim 1, wherein the sulfur reactant is present in the waste composition, generated in situ, supplied to the vessel, or a combination thereof.

8. The method of claim 1, wherein the molar ratio of the sulfur reactant to the sulfur repeating units of the polyarylene sulfide is about 1 or less.

9. The method of claim 1, further comprising supplying water to the vessel prior to heating to a temperature of from about 260° C. to about 285° C.

10. The method of claim 9, wherein the water is added such that the molar ratio of added water to the sulfur repeating units of the polyarylene sulfide is from about 1.5 to about 3.

11. The method of claim 1, wherein the waste composition contains an arylene sulfide oligomer, cyclic polyarylene sulfide, fine polyarylene sulfide particles, or a combination thereof.

12. The method of claim 11, wherein the cyclic polyarylene sulfide has the following general formula:

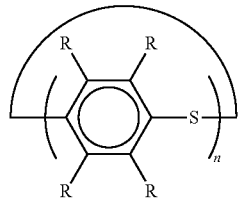

wherein,
n is from 4 to 30; and
R is independently hydrogen, alkyl, cycloalkyl, aryl, alkylaryl, or an arylalkyl radical having from about 6 to about 24 carbon atoms.

13. The method of claim 11, wherein the oligomer has a number average molecular weight of less than about 2,000 Daltons.

14. The method of claim 13, wherein the oligomer has a polydispersity index above about 7 and/or a weight average molecular weight of less than about 20,000 Daltons.

15. The method of claim 11, wherein the fine polyarylene sulfide particles have an average size of about 100 micrometers or less.

16. The method of claim 11, wherein the fine polyarylene sulfide particles have a Do of about 20 micrometers or less.

17. The method of claim 1, wherein the arylene sulfide byproducts exhibit a multimodal molecular weight distribution.

18. The method of claim 1, wherein the method comprises heating the arylene sulfide byproducts during a first stage to a temperature of from about 235° C. to about 260° C. and then heating during a second stage to a temperature of from about 260° C. to about 285° C.

19. The method of claim 18, in which the first stage heating is carried out at a rate of from about 0.1° C. to about 3.0° C.

20. The method of claim 18, in which the second stage heating is carried out at a rate of from about 0.5° C. to about 8.0° C.

21. The method of claim 18, wherein the first stage of heating converts the cyclic polyarylene sulfide into a linear oligomer having the following general formula:

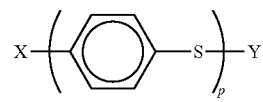

wherein,
p is from 1 to 50; and
X and Y are independently hydrogen, halogen, halogenated phenyl, thiol, phenoxy, hydroxyl, mercaptan group, cyclic amide, amine, or a salt of any of the foregoing.

22. The method of claim 21, wherein the second stage of heating converts the linear oligomer to the high molecular weight polyarylene sulfide.

23. The method of claim 1, further comprising cooling and thereafter washing the high molecular weight polyarylene sulfide.

24. The method of claim 1, wherein the waste composition is mixed with an organic amide solvent prior to being supplied to the vessel.

25. The method of claim 1, wherein the high molecular weight polyarylene sulfide has a polydispersity index of about 7 or less and/or a weight average molecular weight of about 20,000 Daltons or more.

26. The method of claim 1, wherein the polyarylene sulfide has a melt viscosity of about 1000 poise or less as determined according to ISO Test No. 11443 at 310° C. and 1,200/second.

27. The method of claim 1, wherein the waste composition is a filter cake that is a byproduct of a polymerization process.

28. The method of claim 27, wherein the vessel is employed in the polymerization process.

29. The method of claim 1, wherein the high molecular weight polyarylene sulfide is a polyphenylene sulfide.

30. A method for forming a polyarylene sulfide, the method comprising:
forming a SMAB-NaSH complex within a first vessel;
supplying the SMAB-NaSH complex and a dihaloaromatic monomer to a second vessel to form a prepolymer; and
supplying the prepolymer and a dihaloaromatic monomer to a third vessel, wherein a waste composition that contains arylene sulfide byproducts is also supplied to the third vessel,
supplying a sulfur reactant to the third vessel and separately supplying an alkali metal hydroxide to the third vessel;
wherein the arylene sulfide byproducts are heated within the third vessel to a temperature of from about 260° C. to about 285° C. such that the molar ratio of alkali metal hydroxide to sulfur repeating units of the polyarylene sulfide is about 1 or less, thereby forming a high molecular weight polyarylene sulfide having a number average molecular weight of about 2,000 Daltons or more.

31. The method of claim 1, wherein the molar ratio of the alkali metal hydroxide to the sulfur reactant is between about 0.80 and about 1.50.

32. The method of claim 1, wherein the molar ratio of the alkali metal hydroxide to the sulfur repeating units of the polyarylene sulfide is between about 0.200 to about 0.800.

* * * * *